Jan. 13, 1953 H. J. HORN 2,625,438
STAMPED METAL VEHICLE WHEEL
Filed June 18, 1948 2 SHEETS—SHEET 1

INVENTOR.
HARRY J. HORN
BY
Barnes, Kisselle, Laughlin & Raisch
ATTORNEYS

Jan. 13, 1953 H. J. HORN 2,625,438
STAMPED METAL VEHICLE WHEEL
Filed June 18, 1948 2 SHEETS—SHEET 2

INVENTOR.
HARRY J. HORN
BY
ATTORNEYS.

Patented Jan. 13, 1953

2,625,438

UNITED STATES PATENT OFFICE 2,625,438

STAMPED METAL VEHICLE WHEEL

Harry J. Horn, Lansing, Mich., assignor to Motor Wheel Corporation, Lansing, Mich., a corporation of Michigan Application June 18, 1948, Serial No. 33,777

5 Claims. (Cl. 301—9)

This invention relates to stamped metal vehicle wheels which are demountable and which can be mounted either singly or dual.

The vehicle wheel presently used either singly or dual for heavy duty on trucks is either a forging or a rolled formed disc wherein the bolting on flange is a flat annular member thicker than the body part of the disc which is attached to the rim of the wheel. In the vehicle wheel presently used it is necessary to make the bolting on flange considerably thicker than the body part of the disc in order to obtain the strength necessary for such heavy duty wheel.

The present invention contemplates a stamped or pressed disc type metal vehicle wheel wherein the disc is of uniform thickness throughout both the bolting on flange and the body part of the disc which attaches to the wheel rim.

In my stamped metal wheel, the thickness of which is considerably less than that of the present forged or rolled formed disc wheel, I obtain the strength necessary in the bolting on flange by stamping this flange so that it has an irregular contour which is not flat. By thus forming the bolting on flange in my wheel the strength of the flange is increased due to the fact that the load stresses are properly distributed. I also arrange the bolting on flange of my wheel so that when my wheels are mounted either dual or singly the bolting on flanges are preloaded or flexed when the wheel bolts or cap screws are turned tightly into place thereby providing a very advantageous mounting condition.

Figure 2:
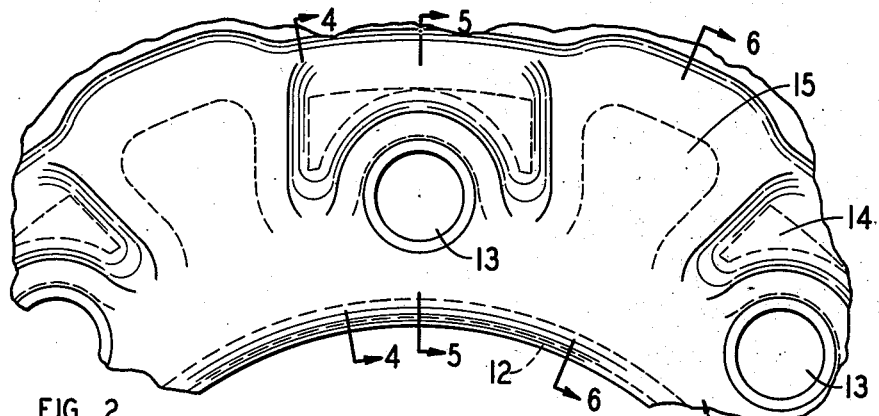
Fig. 2 is a fragmentary elevational view showing the outer or convex side of the bolting on flange of my wheel.
Figure 3:
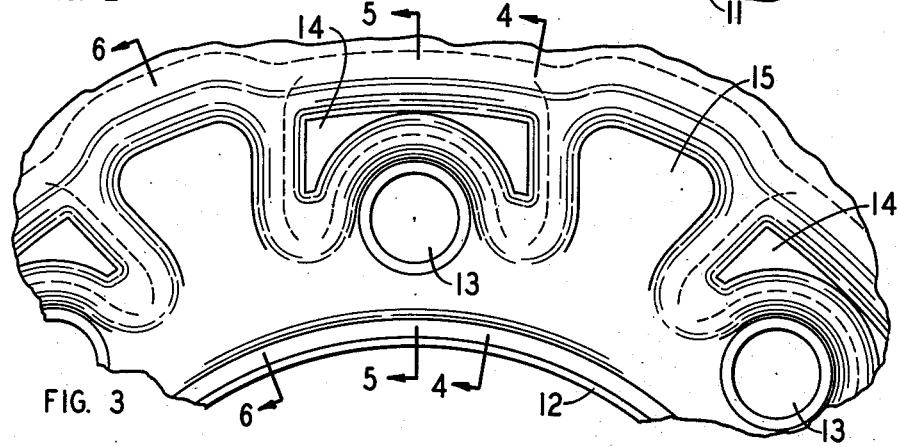
Fig. 3 is a fragmentary elevational view showing the inner or concave side of the bolting on flange of my wheel.
Figures 4, 5, 6:
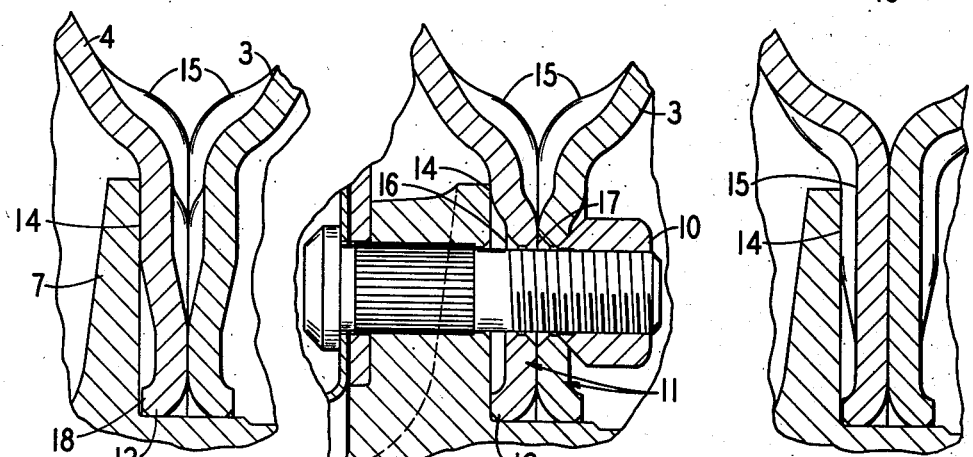

Figs. 4, 5 and 6 are cross sections through the bolting on flange of the wheel along the lines 4—4, 5—5 and 6—6 of Figs. 2 and 3 when the wheels are mounted dual.

Figure 1:
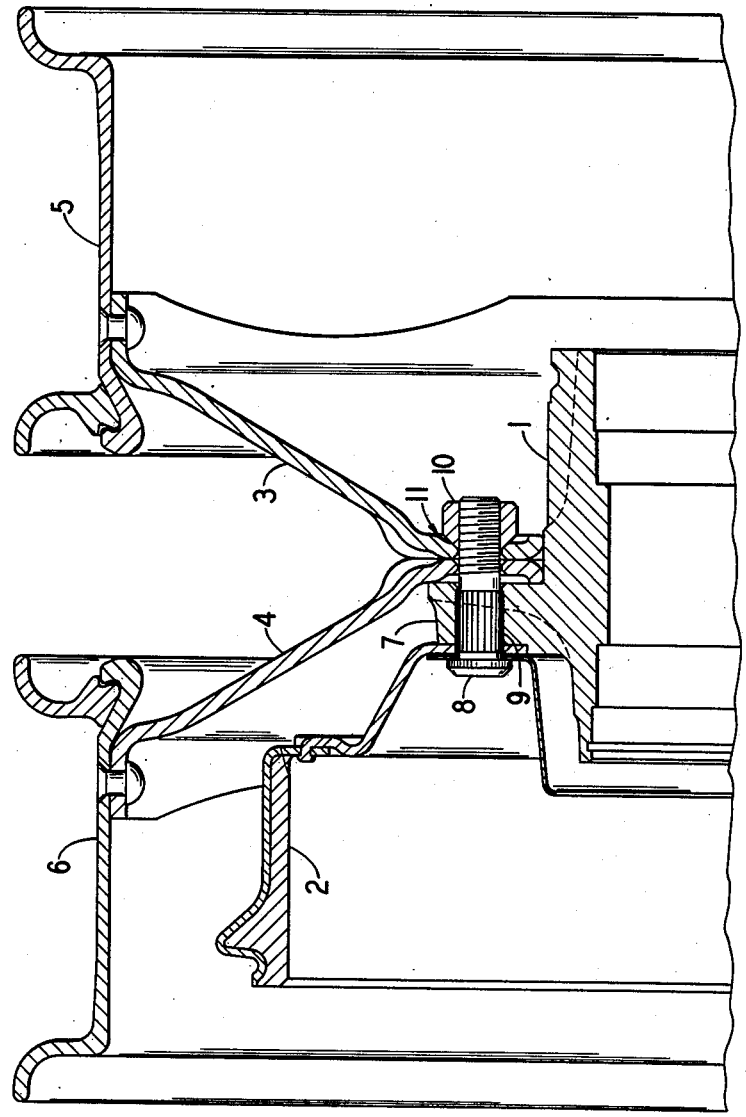
Fig. 1 is a fragmentary radial section showing my dual wheel assembly secured to the wheel hub.

In Fig. 1 of the drawings there is shown a dual wheel assembly consisting of a hub 1, brake drum 2, wheel bodies 3 and 4 which are identical and of the dished disc type, and rims 5 and 6. The wheel bodies 3 and 4 are secured to the hub flange 7 by bolts 8, which pass through openings 9 in the hub flange, and nuts 10, or in any other suitable conventional manner such, for example, as by means of cap screws each having a head of the same configuration as the nut 10 and screwed into the hub flange. The two wheels shown mounted on hub 1 in Fig. 1 are identical, each wheel being in reverse position with respect to the other.

The bolting on flange of my wheel will be generally designated 11 and is shown in detail in Figs. 2 to 6. Referring to these figures it will be seen that the bolting on flange 11 is provided at its inner circumference with an axially extending circumferential flange 12. The circumferentially spaced bolt holes are designated 13. The bolt holes 13 are coplanar, that is, located in the same plane of the bolting on flange. Each bolt hole 13 is surrounded along its outer half circumference with a semi-circular embossment 14 which projects axially from the bolting on flange 11 in the same direction as flange 12. Between each two holes 13 the bolting on flange is provided with an embossment 15, the concave side of which is viewed in Fig. 3 and the convex side of which is viewed in Fig. 2. The convex side of embossment 14 is viewed in Fig. 3 and the concave side in Fig. 2.

Referring to Fig. 5 it will be noted that the inner edge 16 of each bolt hole 13 is offset axially from the embossment 14 whereas the outer edge 17 of each opening 13 is flush with the axially outer face of each embossment 15.

Referring to Fig. 4, it will also be noted that the edge of flange 12 has a small clearance as at 18 with the base of flange 7 of hub 1 before nuts 10 are drawn down tightly on bolts 8. Thus, the embossment 14 extends axially away from the inner edge 16 of hole 13 a slightly greater distance than flange 12. This is important, as stated below.

When the wheels are mounted in dual relation, as shown in Figs. 1, 4 to 6, it will be noted that the wheel body 3 is reversed in relation to wheel body 4. As shown in the drawings, the flat sides of the bolting on flanges 11 of the wheel bodies 3 and 4 contact throughout their full length, that is, around the entire circumference of the outer side of the bolting on flange. The convex faces of embossments 15 will contact face to face on the opposite sides of bolt holes 13 and the circumferential outer edges 17 of the bolt holes will contact face to face. The inner face of the inner wheel body 4 will contact with the bolt flange 7 of the wheel hub only along the semi-circular embossments 14 which act as a fulcrum about which the bolting on flange of the inner wheel flexes as the nuts 10 are drawn down tight until flange 12 of the inner wheel contacts the lower edge of hub flange 7 and takes up clearance 18. This pre-loads the bolting on flange of the inner wheel body 4 which is highly desirable from the standpoint of taking up side thrusts on the wheel body in actual operation. At the same time it should be noted that as the inner wheel body bolting on flange flexes about embossments 14 as a fulcrum, the bolting on flange of the outer wheel body 3 also fulcrums about embossments 15 inwardly toward hub flange 7 as the nuts 10 are drawn down. This likewise pre-loads or pre-stresses the bolting on flange of the outer wheel which is highly desirable in taking up side thrusts of the wheel in actual operation. Thus, in dual relationship bolting on flanges of both the inner and outer wheels are pre-loaded when assembled to the hub flange. Due to this pre-loading, stresses and strains in or on the wheel body are distributed over the continuous circumferential portion of the wheel body along the area of contact between the bolting on flange of the inner wheel and the hub flange and similar stresses on the outer wheel body 3 are distributed along the entire area of contact at the junction of the wheel body portion and the bolting on flange and thus in both wheels these side stresses or strains are not concentrated in the areas of contact between the nuts 10 and the wheel body.

I claim:

1. A stamped metal vehicle wheel comprising a wheel body having an integral bolting on flange provided with a plurality of circumferentially spaced holes located in a planar zone of said bolting on flange, said bolting on flange having a central opening adapted to receive a hub, said bolting on flange having an axially extending flange along the periphery of said central opening, a plurality of substantially semi-circular embossments in said wheel body each adjacent to and extending around the outer half circumference of one of said holes and projecting axially in the same direction as said peripheral flange, the convex faces of said embossments presenting flat bearing surfaces extending substantially around the outer half circumference of each of said holes, said bearing surfaces lying in a plane disposed perpendicularly to the axis of the wheel, a plurality of embossments in said wheel body each located between two of the aforesaid holes and two of the aforesaid embossments, said second mentioned embossments projecting axially in the opposite direction from said peripheral flange, said second mentioned embossments presenting on the convex faces thereof flat bearing surfaces which are narrower in the area between said holes than in the area radially outward of said holes, said last mentioned bearing surfaces having a radial extent greater than the radial extent of said holes, the outer edges of said holes being substantially in the same plane as the flat bearing surfaces presented by the convex faces of said second mentioned embossments and the inner edges of said holes being offset axially outwardly from the edge of said peripheral flange and from the flat bearing surfaces presented by the convex faces of said first mentioned semi-circular embossments.

2. The combination claimed in claim 1 wherein the bolting on flange is positioned generally in a plane perpendicular to the axis of the wheel and the remainder of the wheel body is generally convex.

3. The combination claimed in claim 2 wherein all of said embossments are located generally in the adjoining areas of the wheel body and the bolting on flange.

4. A dual wheel assembly comprising in combination a substantially planar hub flange provided with a plurality of circumferentially spaced openings, a pair of substantially identical stamped metal wheels mounted on said hub flange in reversed relation, each wheel comprising a wheel body having an integral bolting on flange provided with a plurality of circumferentially spaced holes located in a planar zone of said bolting on flange, said bolting on flange having a central opening adapted to receive a hub, said bolting on flange having an axially extending flange along the periphery of said central opening, a plurality of substantially semi-circular embossments in said wheel body each adjacent to and extending around the outer half circumference of said holes and projecting axially in the same direction as said peripheral flange, a plurality of embossments in said wheel body each located between two of the aforesaid holes and two of the aforesaid embossments, said second mentioned embossments projecting axially in the opposite direction from said peripheral flange, said second mentioned embossments being narrower in the area between said holes than in the area radially outward of said holes and extending radially from a line spaced radially inwardly of said holes to a line spaced radially outwardly of said holes, the outer edges of said holes being substantially in the same plane as the faces of the convex side of said second mentioned embossments and the inner edges of said holes being offset axially outwardly from the edge of said peripheral flange and from the convex faces of said first mentioned semi-circular embossments, the inner wheel being mounted on said hub flange with the peripheral flange extending toward the hub flange, the outer wheel being positioned against the inner wheel but in reversed position, the flat sides of said wheels being in continuous circumferential contact, the peripheral flange of the inner wheel in unstressed condition having a small clearance with the hub flange, and means passing through the said openings in said bolting on flanges and into the hub flange for detachably clamping the bolting on flanges to the hub flange, the said means holding the bolting on flanges of the wheels tightly together and the peripheral flange of the inner wheel against the hub flange whereby each of the bolting on flanges is maintained in pre-loaded or flexed condition, the inner wheel body being flexed toward the hub flange about the first mentioned embossments as a fulcrum and the outer wheel body being flexed toward the hub flange about the second mentioned embossments as a fulcrum.

5. A stamped metal vehicle wheel comprising a wheel body having an integral bolting on flange provided with a plurality of circumferentially spaced holes located in a planar zone of said bolting on flange, said bolting on flange having a central opening adapted to receive a hub, said bolting on flange having an axially extending flange along the periphery of said central opening, a plurality of substantially semi-circular embossments in said wheel body each adjacent to and extending around the outer half circumference of one of said holes and projecting axially in the same direction as said peripheral flange, a plurality of embossments in said wheel body each located between two of the aforesaid holes and two of the aforesaid embossments, said second mentioned embossments projecting axially in the opposite direction from said peripheral flange, said second mentioned embossments being narrower in the area between said holes than in the area radially outward of said holes and having a radial extent greater than the radial extent of said holes, the outer edges of said holes being substantially in the same plane as the convex faces of said second mentioned embossments and the inner edges of said holes being offset axially outwardly from the edge of said peripheral flange and from the convex faces of said first mentioned embossments, said bolting on flange being positioned generally in a plane perpendicular to the axis of the wheel and the remainder of the wheel body being generally convex, all of said embossments being located generally in the adjoining areas of the wheel body and the bolting on flange, the peripheral flange projecting axially from the inner edges of said holes a less distance than said first mentioned embossments.

HARRY J. HORN.

REFERENCES CITED

The following references are of record in the file of this patent:

UNITED STATES PATENTS

| Number | Name | Date |
|---|---|---|
| Re. 21,960 | Stough | Nov. 25, 1941 |
| 2,130,392 | Horn | Sept. 20, 1938 |
| 2,317,311 | Stough | Apr. 20, 1943 |
| 2,407,749 | Sinclair | Sept. 17, 1946 |
| 2,453,512 | Jacobi | Nov. 9, 1948 |